Oct. 20, 1959   A. E. BIERMANN   2,909,163
VARIABLE STROKE PISTON ENGINES
Filed July 1, 1955   7 Sheets-Sheet 1

INVENTOR.
Arnold E. Biermann

Oct. 20, 1959 A. E. BIERMANN 2,909,163
VARIABLE STROKE PISTON ENGINES
Filed July 1, 1955 7 Sheets-Sheet 2

INVENTOR.
Arnold E. Biermann

Oct. 20, 1959 A. E. BIERMANN 2,909,163
VARIABLE STROKE PISTON ENGINES
Filed July 1, 1955 7 Sheets-Sheet 3

INVENTOR.
Arnold E. Biermann

INVENTOR.
Arnold E. Biermann

INVENTOR.
Arnold E. Biermann

United States Patent Office 2,909,163
Patented Oct. 20, 1959

2,909,163

VARIABLE STROKE PISTON ENGINES

Arnold E. Biermann, Fairview Park, Ohio

Application July 1, 1955, Serial No. 519,313

24 Claims. (Cl. 123—48)

This invention relates to variable stroke mechanisms for use in internal combustion engines and in compressors. The general objective of the invention is to provide a very compact engine of high torque rating combined in an engine having a high efficiency throughout its operating range.

The conventional automobile engine is most efficient at open throttle conditions. With open throttle the piston friction and the pumping losses are a small portion of the power developed. As the engine is throttled these losses become a greater part of the total power and the engine becomes quite inefficient at low throttle openings. A further reason as to why such engines are inefficient at part load lies in the low combustion chamber pressures under these conditions. Because piston friction and pumping losses constitute a major portion of the open throttle mechanical losses of an engine it is apparent that an ideal method of operating at open throttle or with unrestricted intake is to vary the piston stroke to achieve the power required. This method greatly reduces the friction losses and at the same time improves combustion processes by raising cylinder pressure levels. The potential improvements are sufficiently great as to make it possible to about double the fuel mileage of the average automobile.

The variable stroke engine also permits the use of a much larger engine without incurring the penalties of a higher fuel consumption at low power loadings. If the engine displacement is made sufficiently great the available torque will be of such magnitude that torque converters will not be necessary.

These advantages of the variable stroke engine have long been recognized. Attempts at designing practical variable stroke engines for the automobile, however, have left much to be desired and such engines have not come into commercial use. Generally, such devices have embodied questionable mechanisms for use in the high speed automotive engine. Mechanisms that make use of complicated structures that are difficult to manufacture accurately and inexpensively and that are difficult to maintain because of wear are to be avoided in the automobile engine.

One object of this invention is to provide a variable stroke mechanism that embodies only simple links and levers all joined together with simple pin joints.

Another object of the invention is to provide an engine of conventional arrangement. It is desirable that such an engine have the driveshaft at the lower part of the engine with the cylinders above the driveshaft. Radial and axial engines are deficient in this respect.

Another object of the invention is to provide an engine of such compactness that the piston displacement can be made more than twice that of the conventional automobile engine and yet not require more space.

A further object is to provide an engine having a plurality of cylinder blocks, or banks, with provision for operating the pistons of any one bank at a different stroke length than those of the other banks. Specifically, it is desired to reduce the piston stroke of one or more banks to zero at light loads. This requirement is particularly important for oversize engines that must operate with extremely light loads. Under these conditions the combustion chamber becomes very shallow at the short strokes and poor combustion may result. Consequently, it is desirable in a two-bank engine, to cut out one bank by reducing its stroke to zero. In this manner the depth of the combustion chamber of the operating bank will be twice that obtained with both banks in operation.

Operation of an 8 cylinder engine, having 2 banks of 4 cylinders each, on only 4 cylinders makes it necessary that the mass balance of the engine be satisfactory when operating with only one bank. Another object of this invention is to provide satisfactory balancing at any condition of operation.

A further object of the invention is to provide a mechanism that is suitable for compressors in which the clearance between the piston and cylinder head at the end of the stroke remains practically constant regardless of piston stroke length. This type of operation will be called constant clearance operation.

Another object of the invention is to provide a mechanism suitable for internal combustion engines in which the clearance volume above the piston at the inward end of the piston stroke varies in some predetermined relationship as the piston stroke is varied. (The inward position of the piston is defined here as that position closest to the cylinder head and will also be referred to as top center position.) In order to achieve maximum efficiency it is desirable that the compression ratio of the engine be as high as is compatible with the knock characteristics of the fuel. For a cylindrical combustion chamber the clearance above the piston is equal to the stroke divided by a quantity consisting of the compression ratio minus 1. From this relationship it follows that if the compression ratio is to remain constant as the stroke is varied that the piston clearance must increase linearly as stroke increases. An object of this invention is to provide a mechanism whereby the piston clearance is automatically increased as the stroke is increased.

These and other objects I attain by the construction shown in the accompanying drawings, wherein, for the purpose of illustration, I have shown a preferred embodiment of my invention and wherein.

Figure 1:
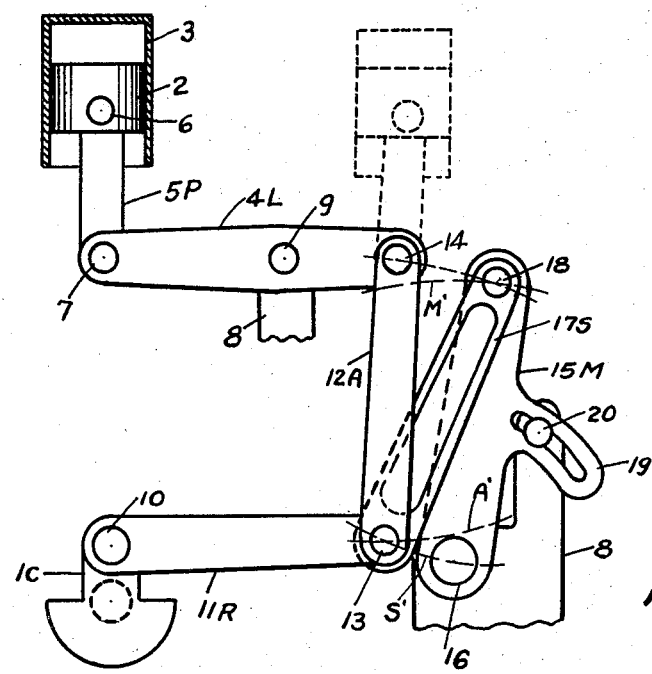
Fig. 1 is a schematic diagram showing the basic variable stroke mechanism of this invention for the case of constant piston clearance. (This is the case wherein the piston returns to the same point at the inward stroke position regardless of piston stroke setting.)

Referring now to the drawings, inasmuch as the invention involves different arrangements of the same basic links and levers, for purposes of illustration these parts have been given the same identifying alphabetical letters in all embodiments regardless of differences in shape. In addition, each part is given a separate numerical identification.

Figure 2:
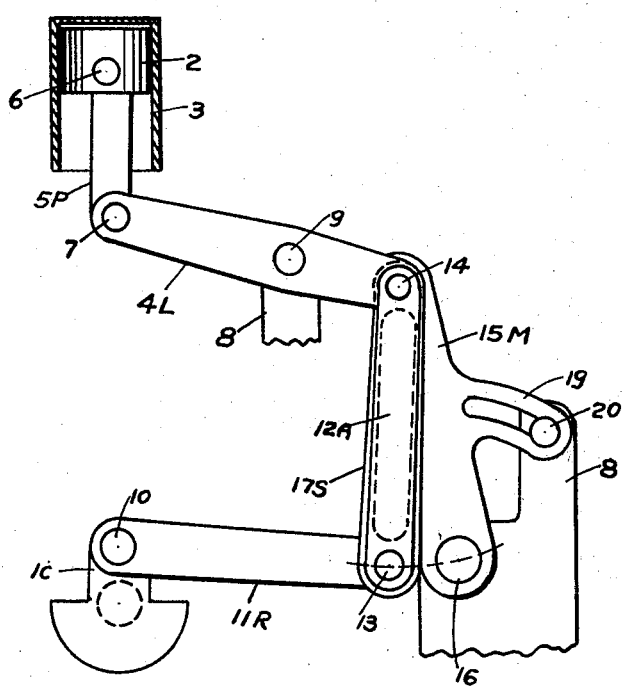
Fig. 2 is a schematic diagram showing the mechanism of Fig. 1 in the zero stroke-length position.
Figure 3:
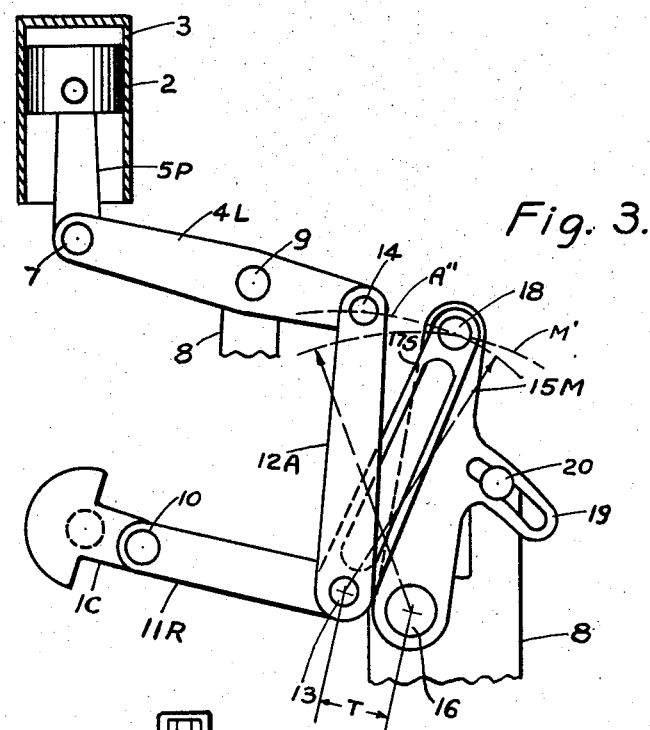
Fig. 3 is a schematic diagram showing the basic variable stroke mechanism for the case in which the clearance between the cylinder head and piston increases as the stroke length increases.

In Figs. 1 to 3 the crank 1C is journaled in the frame of the machine, piston 2 is operable in cylinder 3 and is connected to lever 4L by means of piston rod 5P, piston pin 6 and piston rod pin 7. Lever 4L is pivoted to the engine frame 8 by means of pin 9. Lever 4L is connected to crank pin 10 by means of crank rod 11R and actuating link 12A by means of pin 13 and pin 14. The stroke-change arm 15M is pivoted to frame 8 by means of pin 16. Suspension link 17S is connected to the stroke change arm 15M by means of pin 18 and is connected to actuating link 12A and crank rod 11R through pin 13. Stroke-change arm 15M is provided with a quadrant 19 for engaging a fastening bolt 20.

In Figs. 1 and 2 the design is such as to return the piston to substantially the same top center position regardless of the position of the stroke-change arm 15M. This is accomplished by making actuating link 12A, suspension link 17S and the stroke-change arm 15M of the same length and by making the center of pin 13 coincide with the center of pin 16 at the top center piston position of the crank.

In operation, the piston stroke of the mechanism of Figs. 1 and 2 is varied by rotating stroke-change arm 15M. Zero stroke length is obtained by moving the stroke-change arm 15M so that the center of pin 18 coincides with that of pin 14 as shown in Fig. 2. It will be observed that in Fig. 1 the piston stroke is effected by moving pin 13 along the arc of the circle defined by the suspension link 17S around pin 18. In the zero piston-stroke position, as shown in Fig. 2, zero stroke is effected because pin 13 moves along the arc of a circle that is common to both pin 14 and pin 18. When the stroke-change arm 15M is moved to the position as shown in Fig. 1 the arc A' with pin 14 as center deviates from the position of arc S' having pin 18 as center. The distance between these arcs produces movement of the actuating link 12A which produces motion of the piston.

The mechanism illustrated by Figs. 1 and 2 is adapted to compressors. In this field it is desirable to provide a minimum piston clearance regardless of stroke length.

The mechanism illustrated by Fig. 3 is similar to that of Fig. 1 with the exception that at the top center position of crank 1C the axes or centers of pins 13 and 16 are displaced one from the other a distance T. With the crank at the top center position as shown, this construction causes pin 18 to swing about arc M' when the stroke-change arm is moved. This action causes the piston clearance to increase as piston stroke is increased and conversely. The amount of the change in piston clearance with change in piston stroke can be varied by varying the magnitude of the dimension T which in turn changes the relationship of arc A" with respect to arc M'. It will be observed that because the piston clearance is a function of the distance between arc A" and arc M' that non-linear variations of piston clearance with piston stroke may be obtained by changing the radius of arc A" or of arc M'. Likewise, specific variations of piston clearance may be obtained by moving pin 16 vertically with respect to pin 13. From this diagram it is apparent that the lengths of 12A, 17S and 15M can be varied to achieve specific results. It is particularly important to observe that in practice it may be necessary to vary the ideal dimensions of these parts to achieve an optimum configuration.

In the mechanisms illustrated by Figs. 1 to 3 it will be observed that a variable stroke can also be effected when pin 18 is revolved to the crank side of pin 14. This operation changes the phase relationship of the crank and the piston by 180 degrees. The former top center position is now the bottom center position.

Figure 4:
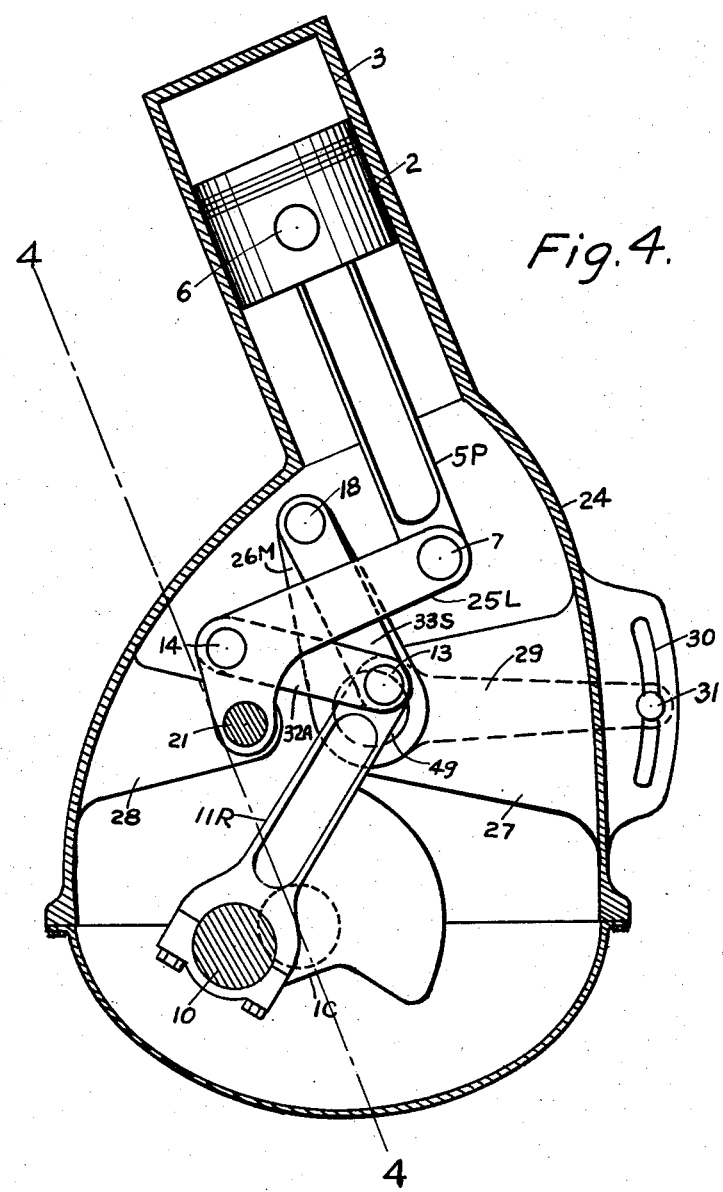
Fig. 4 is a section view of one form of the invention in which a single bank of cylinders is employed.
Figure 5:
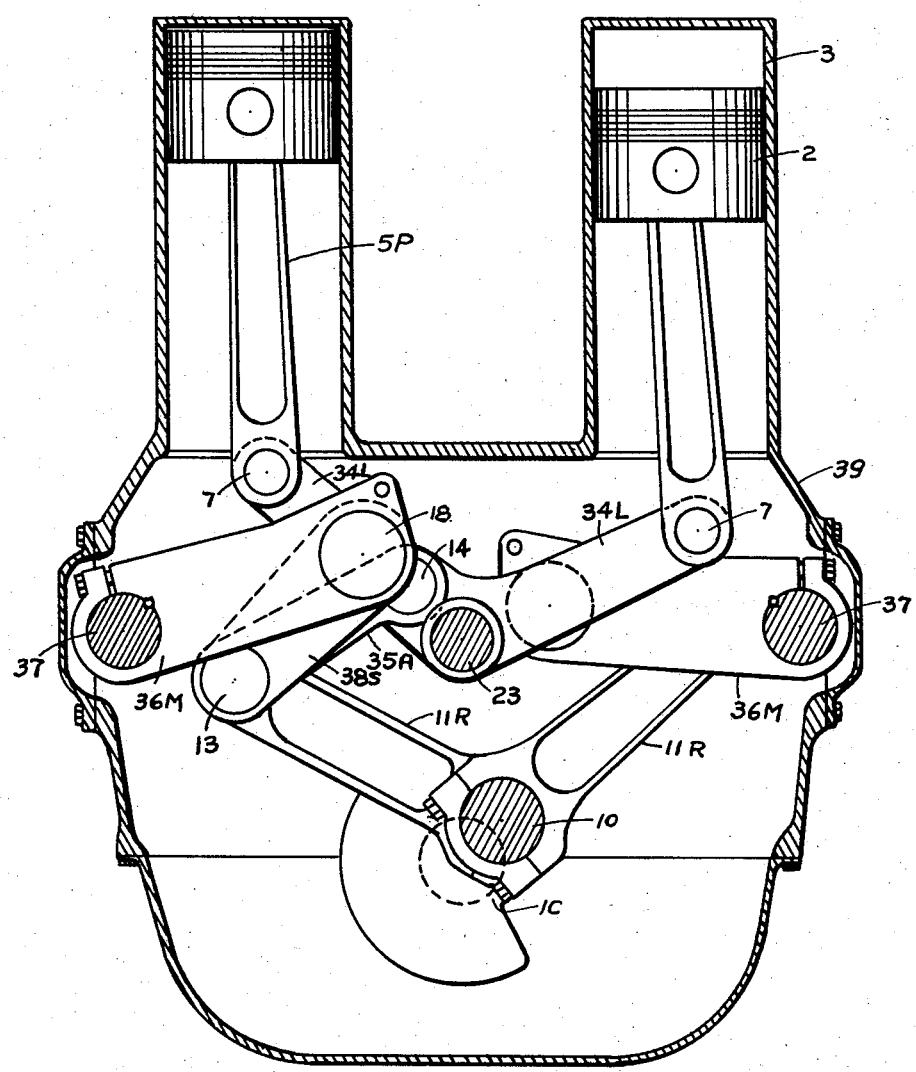
Fig. 5 is a section view of an embodiment of the invention in which two banks of cylinders are employed.
Figure 6:
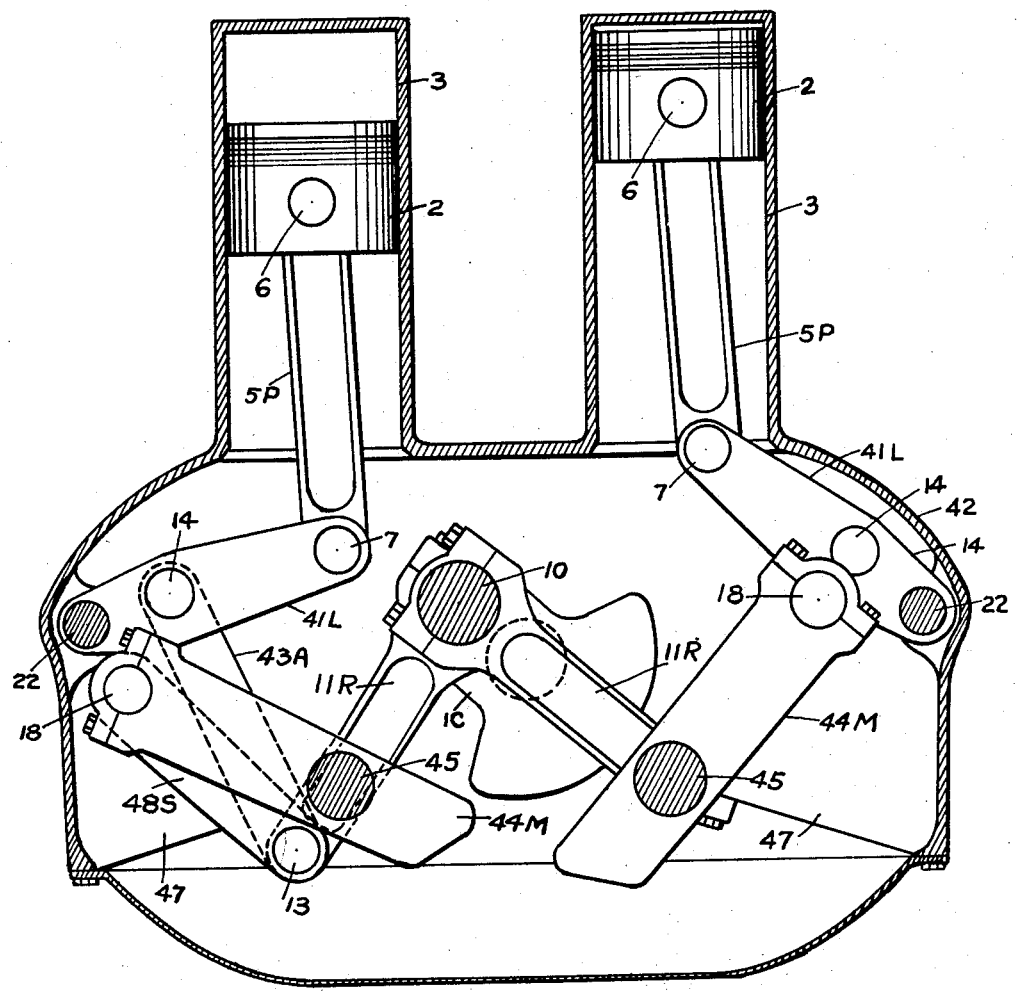
Fig. 6 shows a section view of a preferred embodiment of the invention.

Figs. 4, 5 and 6 illustrate embodiments of the basic mechanism shown in Fig. 3. These three embodiments are distinguished mainly by the position of the fulcrum for the lever L. In Fig. 4 the fucrum shaft 21 for lever L is located on the cylinder side of line 4—4. Line 4—4 is parallel to the cylinder axis and passes through the crankshaft axis. In Fig. 5 the fulcrum shaft 23 is located on a line which is parallel to the cylinder axis and which passes through the crankshaft axis. In Fig. 6 the fulcrum shaft 22 is located on the side of the cylinder away from the crankshaft.

In Figs. 4, 5 and 6 crankshaft 1C, piston 2, cylinder 3, piston pin 6, piston connecting rod 5P, crank rod 11R and pins 6, 7, 14, 13 and 18 are essentially alike.

In Fig. 4 the crankshaft 1C is journaled in the engine frame 24 in a conventional manner. The lever 25L is mounted on fucrum shaft 21 which is journaled in bracket 28 of the engine frame 24. Stroke-change arm 26M is pivoted to the bracket 27 of engine frame 24. The actuating arm 29, which is attached to stroke-change arm 26M, is adjustably fastened to quadrant 30 by means of bolt 31. Crank pin 10 is connected to lever 25L by means of actuating link 32A, crank rod 11R and connecting pins 13 and 14. Piston 2 is connected to lever 25L by means of pins 6 and 7. The stroke-change arm 26M is linked to pin 13 by means of suspension link 33S through pin 18.

Although the mechanism of Fig. 4 illustrates a single cylinder engine it also portrays the essential elements for a bank of 4, 6 or 8 cylinders. By repeating the mechanism shown attached to the crankshaft in opposite hand on the other side of line 4—4 it is possible to obtain a two-bank engine of 8 or 12 cylinders.

Fig. 5 shows a double bank cylinder arrangement in which the fulcrum shaft 23 is on the center line of the engine and provides a common mounting for the levers 34L. In this embodiment the crankshaft 1C is journaled in engine frame 39. Crank pin 10 is connected to lever 34L by means of crank rods 11R, actuating links 35A and pins 13 and 14. The stroke-change arms 36M are mounted on shafts 37 which are journaled in the engine frame 39. Stroke change arms 36M are connected to pins 13 by means of suspension links 38S and pins 18.

Figure 7:
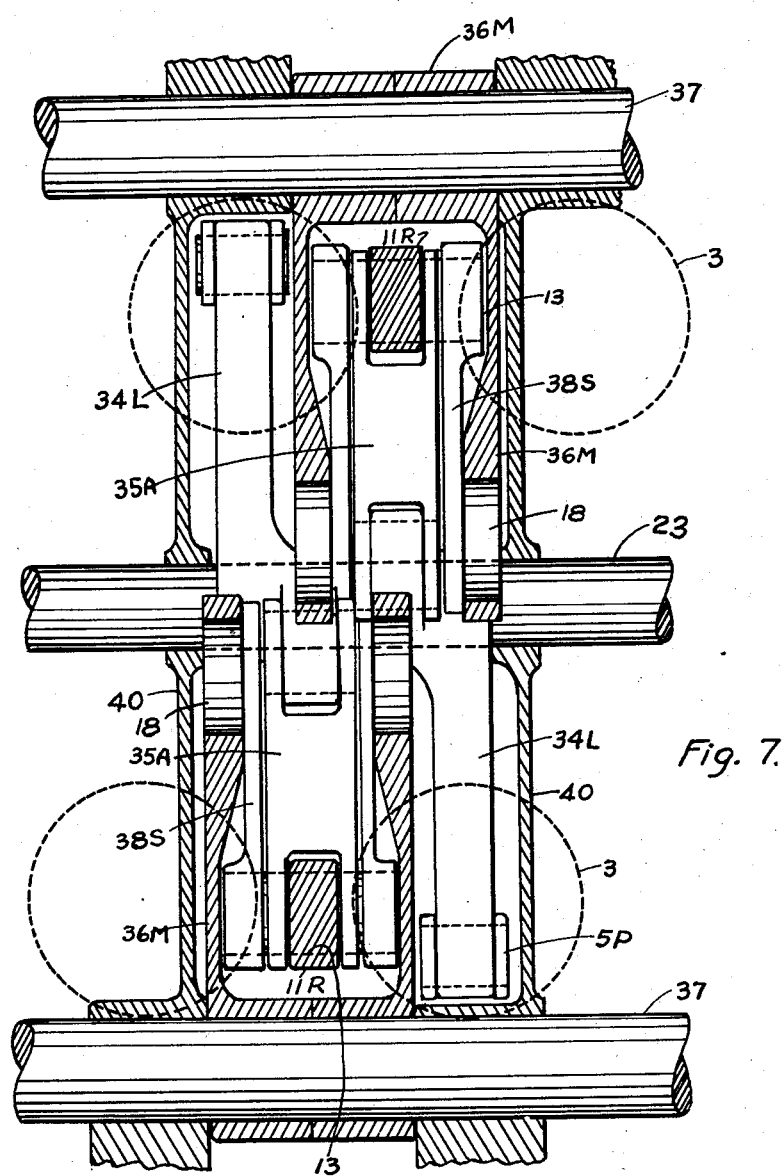
Fig. 7 is a schematic partial section view showing the linkage of Fig. 5 as viewed from the lower part of Fig. 5 looking upward toward the cylinders.

Fig. 7 is a schematic diagram showing a plan view of the linkage of Fig. 5. The position of 4 of the engine cylinders is indicated by the circles 3. The fulcrum shaft 23 is supported in the engine frame by the transverse webs 40 which extend from one side of the crankcase to the other side.

In Fig. 5 the piston stroke is varied by rotating the stroke change arms 36M by any convenient means. The stroke change arm for one bank of cylinders may be rotated independently of the other as indicated by the position of the two stroke-change arms 36M.

Figure 8:
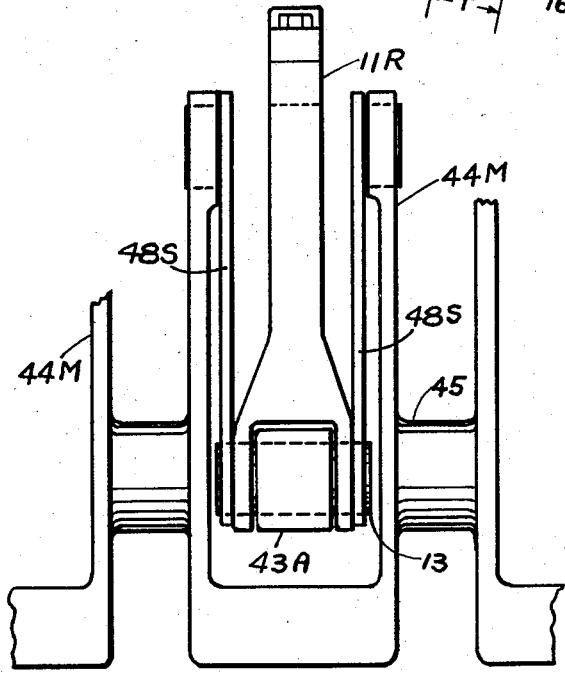
Fig. 8 is a partial view showing some of the linkage of Fig. 6.

Fig. 6 shows a preferred embodiment of the invention in which the fulcrum shafts 22 for the levers 41L are located on the sides of the engine crankcase 42. The crankshaft 1C is journaled in transverse webs 47 extending across the crankcase. The stroke-change arms 44M, which are illustrated in Fig. 8, are provided with journals 45 which are mounted in webs 47 of the crankcase 42. In Fig. 6 the crankpin 10 is connected to levers 41L by means of crank rods 11R, actuating links 43A and pins 13 and 14. The stroke-change arms 44M are connected with pins 13 by means of suspension links 48S and pins 18. The pistons 2 are connected with levers 41L by means of piston rods 5P and pins 6 and 7.

In the mechanism of Fig. 6 the stroke is varied by rotating the stroke-change arm 44M. This may be done by any convenient means.

The embodiments of the invention shown in Figs. 5 and 6 are designed as 8 cylinder, 2 bank engines. In order to obtain even sequences of engine firing with this cylinder arrangement it is necessary that top center piston position on one cylinder in one bank be 90 crank degrees from top center piston position in one cylinder in the other bank. The designs in Figs. 5 and 6 accomplish this requirement by utilizing opposite-hand embodiments of the mechanism and by properly orienting the mechanisms with respect to the crankshaft. This feature is covered broadly by my patent specification entitled "Multi-Cylinder Internal Combustion Engine," which was filed on the same date as this specification.

From a construction standpoint and from the standpoint of compactness there is quite an advantage in placing the cylinder banks parallel and adjacent as shown in Figs. 5 and 6. It is apparent, however, that the cylinder banks may be tilted toward each other or away from each other without altering the accomplishment of even firing intervals.

A 12 cylinder, 2 bank engine which embodies the subject mechanism must provide a crankshaft interval of 60 degrees between top center piston positions of the two banks in order to obtain even firing intervals. This can be accomplished in the subject invention by suitably orienting the variable stroke mechanism with respect to the crankshaft.

The engine design shown in Fig. 5 is a preferred embodiment of the invention for applications in which a narrow engine is desired. The design shown in Fig. 6 is a preferred arrangement for applications in which a short engine is desired and in which simplicity of layout is important. Unlike other variable stroke engine proposals this invention provides a practical, straightforward linkage involving only simple pin joints and simple levers and links. All motion is in a single plane. There is no necessity for ball joints, across-head slides or other impractical mechanisms for highly loaded, high speed engines.

The engine designs shown in Figs. 4, 5 and 6 are such as to obtain approximate simple harmonic motion of the piston. For each 90 degrees of crank travel from top center position of the piston, the piston moves through approximately half of its stroke. In the conventional crank mechanism deviations from harmonic motion arise because of the angularity of the connecting rod. The crank C and crank rod R of the subject mechanism cause a deviation from harmonic motion. The lever L, however, in combination with the actuating link A serve to introduce into the system a movement of opposite direction and of sufficient magnitude to effectively cancel the deviations from simple harmonic motion introduced by the crank and crank rod. The resulting piston motion is approximately simple harmonic motion at all stroke lengths. The attainment of harmonic motion in a mechanism of this character is very important because overall engine balance is obtained by providing a multiple number of cylinders in a bank and because the mass of the linkage is somewhat greater than that of conventional crank mechanisms. The deviation from harmonic motion in a conventional 4 cylinder in-line engine is very undesirable. Consequently, if only one bank of a two-bank 8 cylinder engine of the subject type is operated by itself it is very important that harmonic motion of the pistons be obtained.

Figure 9:
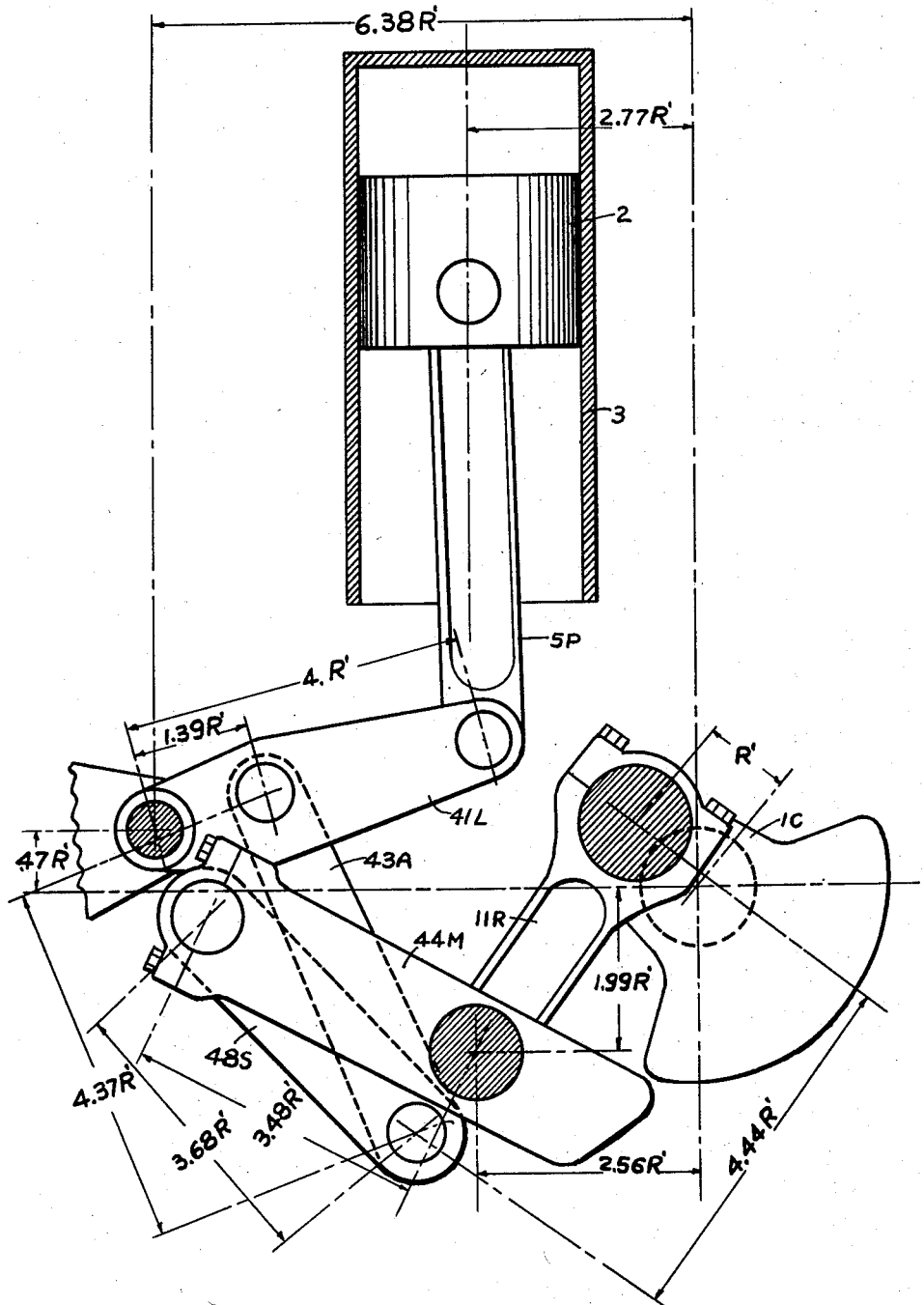
Fig. 9 is a schematic diagram of the mechanism of Fig. 6 showing preferred dimensions of the parts in terms of the crank radius R.

The achievement of approximate harmonic piston motion together with even firing intervals in a multibank engine of the type described necessitates compromises in design to achieve an optimum configuration. This fact is particularly true when a wide stroke range is desired combined with the necessity for making the mechanism simple. Fig. 9 shows such an optimum design in which the controlling dimensions are given in terms of the crank radius R. Generally these dimensions can be modified by a factor of plus or minus 10 percent without departing seriously from the objective. For example, Fig. 9 shows that the length of the suspension link 48S should be 3.68 times the crank radius R for optimum results. This dimension can be decreased or increased by approximately 10 percent without seriously affecting harmonic motion of the piston.

In Fig. 1 it will be observed that the piston 2 may be attached directly to link 12A as shown by the dotted lines and thus dispense with lever 4L and link 5P. This provides a simpler construction and one that is useful for short-stroke engines.

Because the construction of my invention as indicated in the foregoing is otherwise capable of considerable modification without in any manner departing from the spirit of the invention, I do not wish to be understood as limiting myself to the specific arrangements disclosed except as hereinafter claimed.

I claim:

1. In a variable stroke piston engine having a frame, a cylinder on said frame, a piston reciprocable in said cylinder, a combination comprising a crank journaled for rotation in said frame, a stroke-change arm pivoted on said frame, a suspension link pivoted to said stroke-change arm, a crank rod pivoted to said crank and to said suspension link, a lever pivoted to said frame, an actuating link connecting said lever and said suspension link and a piston rod connecting said piston and said lever.

2. An engine as described in claim 1 in which said stroke-change arm, said suspension link and said actuating link are of substantially the same length between pivot points.

3. An engine as described in claim 2 in which said stroke-change arm pivot on said frame coincides with the pivoted junction of said actuating link and said suspension link at top center position of said piston for obtaining constant piston clearance as the piston stroke is varied by moving said stroke-change arm.

4. An engine as defined in claim 1 in which at top center piston position the pivoted junction of said suspension link and said actuating link is displaced from the pivot of said stroke-change arm in said frame an amount sufficient to cause a preselected variation of top-center piston clearance as the piston stroke is varied by moving said stroke-change arm.

5. An engine as defined in claim 1 in which the relative lengths of said stroke-change arm, said suspension link and said actuating link are such as to cause a preselected variation of top-center piston clearance as the piston stroke is varied by moving said stroke-change arm.

6. In a variable stroke engine having a frame, a cylinder bank with multiple numbers of cylinders mounted on said frame, pistons reciprocable in said cylinders, a combination comprising a crankshaft journaled in said frame, stroke change arms pivoted on said frame, suspension links pivoted to said stroke-change arms, crank rods pivoted to cranks of said crankshaft and to said suspension links, levers pivoted to said frame, actuating links connecting said levers and said suspension links, and piston rods connecting said pistons and said levers.

7. An engine as described in claim 6 in which the axes of said cylinders are located to one side and parallel to a center line intersecting the axis of said crankshaft, said pivots for mounting said levers on said frame being located between said cylinder axes and said center line.

8. An engine as described in claim 7 in which the mechanism described, except for said crankshaft, is duplicated in opposite hand to form a variable stroke engine having two adjacent and parallel banks of cylinders operating from a common crankshaft.

9. An engine as described in claim 6 in which the cylinder axes are located to one side and substantially parallel to a center line intersecting the axis of said crankshaft, said pivots for mounting said levers on said frame being located on said center line.

10. An engine as described in claim 9 in which the mechanism as described, except for said crankshaft, is duplicated in opposite hand to form a variable stroke engine having two adjacent and parallel banks of cylinders operating from a common crankshaft.

11. An engine as described in claim 6 in which the cylinder axes are located to one side and substantially parallel to a center line intersecting the axis of said crankshaft said pivots for said levers on said frame being located away from said center line at a greater distance than the distance from the cylinder axis to said center line.

12. An engine as described in claim 11 in which the mechanism described, except for said crankshaft, is duplicated in opposite hand to form a variable stroke engine having two adjacent and parallel banks of cylinders operating from a common crankshaft.

13. In a multi-cylinder engine having multiple banks of cylinders mounted on an engine frame, pistons reciprocable in said cylinders, a combination comprising a crankshaft rotatably mounted in said frame, stroke-change shafts journaled in said frame for mounting stroke-change arms, suspension links pivoted to said stroke-change arms, crank rods pivoted to cranks of said crankshaft and to said suspension links, levers pivoted to said frame, actuating links connecting said levers and said suspension links, piston rods connecting said pistons and said levers, said stroke-change shafts being independently operable to vary the piston stroke of the pistons of any one cylinder bank independently of the pistons in the other cylinder banks.

14. An engine as described in claim 12 in which the length of each of said crank rods is substantially 4.44 times the radius of said crank, the length of each of said suspension links is substantially 3.68 times the crank radius, the length of each of said stroke-change arms is substantially 3.48 times the crank radius, the length of each of said actuating links is substantially 4.37 times the crank radius, the location of each of said stroke-change arms is substantially 2.56 times the crank radius from said center line and is substantially 1.99 times the crank radius from a second centerline drawn normal to said centerline and through the axis of said crankshaft, the term in the foregoing denoted as substantially being defined as that value of the dimension that lies within plus or minus 10 percent of the dimension.

15. In an internal combustion engine of the class described having a frame, a crankshaft journaled in said frame, banks of cylinders mounted on said frame adjacent to each other with the axes of said cylinders substantially parallel, pistons reciprocable in said cylinders, a combination comprising stroke change arms pivoted to said frame, crank rods pivoted to cranks of said crankshaft and to said suspension links, levers pivoted to said frame, actuating links connecting said levers and said suspension links, piston rods connecting said pistons and said levers, pairs of pistons being connected to each crank throw of said crankshaft by means of the foregoing said linkage in such a manner as to cause one piston of each pair of pistons to cyclically precede the other piston by an amount substantially equal in crankshaft degrees to 720 divided by the total number of cylinders in the engine.

16. In a variable stroke piston engine having a frame, a cylinder on said frame, a piston reciprocable in said cylinder, a combination comprising a crank journaled for rotation in said frame, a stroke-change arm pivoted on said frame, a suspension link pivoted to said stroke-change arm, a crank rod pivoted to said crank and to said suspension link, a lever pivoted to said frame, an actuating link connecting said lever and said suspension link, and a piston rod connecting said piston and said lever, the axis of said cylinder being located to one side and parallel to a center line intersecting the axis of said crankshaft, said pivot for mounting said lever on said frame being located between said cylinder axis and said center line.

17. A device as claimed in claim 1 in which the axis of said cylinder is located to one side and parallel to a center line intersecting the axis of said crank, said pivot for mounting said lever on said frame being located on said center line.

18. A device as claimed in claim 1 in which the axis of said crank and the pivot axis of said stroke-change arm is located in such a position that a line intersecting said crank axis and said pivot axis of said stroke-change arm is substantially at right angles to the axis of said cylinder.

19. A device as claimed in claim 1 in which the pivot axis of said stroke-change arm and the pivot axis of said lever are located on a line substantially normal to the axis of said cylinder.

20. A device as claimed in claim 1 in which said cylinder and said crank are located on the same side of a line passing through the pivot axis of said stroke-change arm and the pivot axis of said lever.

21. In a variable stroke engine having pairs of cylinders with pairs of pistons actuated from a single crank pin and in which one piston is 90 crankshaft degrees out of phase with respect to the other piston of said pair, a frame, cylinders mounted on said frame pistons reciprocable in said cylinders, a crankshaft journaled in said frame, piston stroke-change mechanisms actuated by said crankshaft, one of said pistons of a pair being actuated from one crank pin of said crankshaft by means of one of said stroke-change mechanisms and the other of said pistons of said pair being actuated from the same crank pin by another of said stroke-change mechanisms, the latter stroke-change mechanism being mounted in said frame in opposite hand with respect to the first-mentioned stroke-change mechanism.

22. In a variable stroke engine having pairs of cylinders with pistons actuated from a single crank pin by means of separate stroke-change mechanisms employed in opposite hand, a frame, cylinders mounted on said frame, pistons reciprocable in said cylinders, a crank journaled for rotation in said frame, stroke-change arms pivoted on said frame, suspension links pivoted to said stroke-change arms, crank rods pivoted to said crank and to said suspension links, levers pivoted to said frame, actuating links connecting said levers and said suspension links, and piston rods connecting said pistons and said levers, the axis of said crank being located between said cylinders and a line drawn through the pivot axis of said stroke-change arms.

23. In a variable stroke internal combustion engine having a multiple number of cylinders, a frame, cylinders mounted on said frame, pistons reciprocable in said cylinders, a crankshaft journaled in said frame, variable stroke mechanisms for actuating said pistons from said crankshaft, each of said variable-stroke mechanisms having stroke-change arms for varying the stroke of the attached pistons independently of the strokes of the other pistons of said engine.

24. In a variable-stroke mechanism for reciprocating a piston in a cylinder, a frame, a crank journaled in said frame, a cylinder on said frame, a piston reciprocable in said cylinder, a lever pivoted on said frame, said piston linked to said lever, a stroke-change arm pivoted on said frame, an actuating link pivoted to said lever, a crank rod connecting said crank and said actuating link, means for moving the connecting junction of said crank rod and said actuating link along the arc of a circle having its center on said stroke-change arm for reciprocating said piston as said crank is rotated.

References Cited in the file of this patent

UNITED STATES PATENTS

| | | |
|---|---|---|
| 1,095,675 | Rietti | May 5, 1914 |
| 1,112,832 | Pierce | Oct. 6, 1914 |
| 1,909,372 | McCollum et al. | May 16, 1933 |
| 2,062,209 | Cook | Nov. 24, 1936 |
| 2,357,031 | Stabler | Aug. 29, 1944 |

FOREIGN PATENTS

| | | |
|---|---|---|
| 13,703 | Great Britain | June 20, 1898 |
| 378,368 | France | Aug. 8, 1907 |
| 399,317 | France | Apr. 17, 1909 |
| 720,427 | France | Dec. 3, 1931 |
| 207,108 | Germany | Feb. 20, 1909 |